United States Patent [19]
Dempsey

[11] Patent Number: 5,422,716
[45] Date of Patent: Jun. 6, 1995

[54] METHOD FOR ON-SITE MEASUREMENT OF STROBE LIGHT INTENSITY ON AIRCRAFT

[75] Inventor: Robert H. Dempsey, Carson City, Nev.

[73] Assignee: Strotek, Inc., Carson City, Nev.

[21] Appl. No.: 180,919

[22] Filed: Jan. 12, 1994

[51] Int. Cl.$^6$ ............................................. G01J 1/42
[52] U.S. Cl. ................................. 356/218; 250/214 B
[58] Field of Search ............... 356/213, 218, 219, 221, 356/222, 226, 121-123; 250/214 B, 206.1, 206.2; 340/981, 961, 941, 942, 963, 970, 972, 974

[56] References Cited

U.S. PATENT DOCUMENTS

| | | | |
|---|---|---|---|
| 3,582,210 | 6/1971 | Jones | 356/218 |
| 3,885,226 | 5/1975 | Lang et al. | 340/981 |
| 4,419,012 | 12/1983 | Stephenson et al. | 250/214 B |
| 4,602,272 | 7/1986 | Duschl | 356/121 |

FOREIGN PATENT DOCUMENTS

5087630  4/1993  Japan .................................. 356/213

Primary Examiner—Richard A. Rosenberger
Assistant Examiner—Hoa Q. Pham
Attorney, Agent, or Firm—Thorpe North & Western

[57] ABSTRACT

A method and system for on-site measurement of strobe light intensity on an aircraft is disclosed, including the steps of orienting a photometric sensor toward the strobe light on the aircraft to be measured and determining the distance between the strobe light and the sensor. When the strobe light is operated, the photometric sensor detects light intensity based on transmittance from the strobe light. The detected light intensity is correlated with the distance between the sensor and the strobe light to generate a data reading representing an estimate of light intensity emanating from the strobe light. Each of these steps is repeated to determine additional data readings representing estimates of light intensity for the same light. The data is then stored in a memory storage means, such as a computer, and then processed to determine the average value of light intensity for the strobe light.

21 Claims, 11 Drawing Sheets

Fig. 6a  TYPICAL STROBE WAVEFORM FROM OPTICAL SENSOR

Fig. 6b  DIGITIZATION PROCESS — DIGITIZING POINTS

Fig. 6d

Fig. 6c  ESTABLISH SIGNAL PARAMETERS — BASELINE

Fig. 6e  INTEGRATION OF SIGNAL

METHOD FOR ON-SITE MEASUREMENT OF STROBE LIGHT INTENSITY ON AIRCRAFT

BACKGROUND OF THE INVENTION

The present invention relates to a method for measuring the intensity of aircraft strobe lights, and in particular, to a method for measuring the intensity of anticollision lights to ensure that the lights are in compliance with standards propagated by the Federal Aviation Administration regarding minimum effective intensity.

In 1971, the Federal Aviation Administration propagated safety guidelines which require that certain airplanes and other aircraft have anticollision systems to prevent accidents. Part of the anticollision system requirements relate to the use of flashing lights to warn those on the ground and other aircraft of the plane's location. See FAA Airworthiness Standards, Anticollision Light System, §23.1401, 25.1401, 27.1401, and 29.1401. These anticollision lights are usually strobe lights or rotating beacons. For ease of reference, the lights will be referred to as strobe lights.

The regulations required that the airplanes have lights with a minimum effective intensity of 400 candles when measured within ±5 degrees of a horizontal plane. The effective intensity is figured by:

$$I_e = \frac{\int_{t_1}^{t_2} I(t)dt}{0.2 + (t_2 - t_1)}$$

where: $I_e$=effective intensity (candles).

$I(t)$=instantaneous intensity as a function of time.

$t_2-t_1$=flash time interval (seconds).

Until recently, however, the FAA has not enforced these regulations. The primary reason for the FAA's nonenforcement is that, until now, there has been no practical method for testing anticollision lights to ensure that the lights comply with the guidelines. Prior to the present invention, the lights had to be removed from the airplane and sent to a lab. The lights were placed in light-tight rooms and then illuminated to determine the candles produced. If the lights were below the minimum standards, they could be replaced. A finding that the lights were above the 400 candle minimum was of little long-term comfort, however, because Xenon strobe lights have a half life of just over two months. An example of the decline in effective intensity is provided in FIG. 1A. As can be seen from the graph, the effective intensity of a light can quickly pass from acceptable to substandard, thereby rendering the aircraft unsafe. This occurs because each time the Xenon in the flash tube of the strobe light is activated, a small amount of material (principally metal) collects on the flash tube wall. The continued build-up of the material interferes with light leaving the flash tube, and will ultimately prevent the flash from being seen unless the flash tube is serviced.

Prior to the present invention, the only solution to achieve complete compliance was to remove each strobe light off of an aircraft every month or two and have the lights analyzed in a lab. This required a significant amount of man hours and equipment to manually disassemble the light from the aircraft and replace it after testing. Not only did this present a significant out-of-pocket cost, but also resulted in even greater expense in view of aircraft down time. It is not surprising that the aircraft industry was reluctant to perform the regular maintenance necessary to insure compliance with these safety standards.

Because of these problems, most airlines, as well as the FAA, have virtually ignored the regulations. In February of 1992, a worldwide FAA study found that no airline company was actually testing its strobes to ensure that they complied with the regulations. In fact, many airlines waited until the strobe lights were noticeably deficient to the naked eye before replacing the strobe light. Some even waited until the strobe lights stopped blinking altogether before replacing the flash tube. Because the naked eye, especially when close to the aircraft, is a poor judge of the effective intensity, merely looking at the strobe lights is an ineffective way of determining whether they comply with the FAA regulations.

There have been several aircraft accidents recently which could have been avoided had the anticollision lights been within the standards set by the FAA. In light of this, the FAA has recently indicated that it would require airlines and other aircraft companies to develop and implement programs to test and maintain their anticollision lights in accordance with the regulations.

Because no practical system for testing the lights is currently on the market, there is a great need for a method for on site measuring of light intensity of strobe lights on aircraft. There is a special need for such a method which is mobile and can be used without requiring unnecessary down time for the aircraft, and for a method which accurately tests the lights without the need of a light-tight room.

SUMMARY OF THE INVENTION

It is a primary object of the present invention to provide a method for site measurement of light intensity of aircraft anticollision lights without removing the lights from the aircraft.

It is another object of the present invention to provide a method for measuring the light intensity of aircraft strobe lights in close proximity to the airplane.

It is an additional object of the invention to provide a method for measuring the light intensity of aircraft strobe lights from a position adjacent to the runway while the aircraft is waiting to take off.

It is yet another object of the present invention to provide a method for measuring the light intensity of aircraft strobe lights which uses a mobile measuring device so that the measurements can be taken without need to move the plane.

The above and other objects of the present invention will be apparent to those skilled in the art from the description contained herein. The method includes the steps of orienting a photometric sensor toward the strobe light on the aircraft to be measured and determining the distance between the strobe light and the sensor. When the strobe light is operated, the photometric sensor detects light intensity based on transmittance from the strobe light. The detected light intensity is correlated with the distance between the sensor and the strobe light to generate a data reading representing an estimate of light intensity emanating from the strobe light. Each of these steps is repeated to determine additional data readings representing estimates of light intensity for the same light. The data is then stored in a memory storage means, such as a computer, and then processed to determine the average value of light intensity for the strobe light.

When performed on the anticollision strobe lights on an aircraft, the method ensures that each light tested complies with FAA standards. Such compliance decreases the risk of collision and reduces the threat of liability which violating the regulations entails.

DETAILED DESCRIPTION OF THE INVENTION

Figure 1:
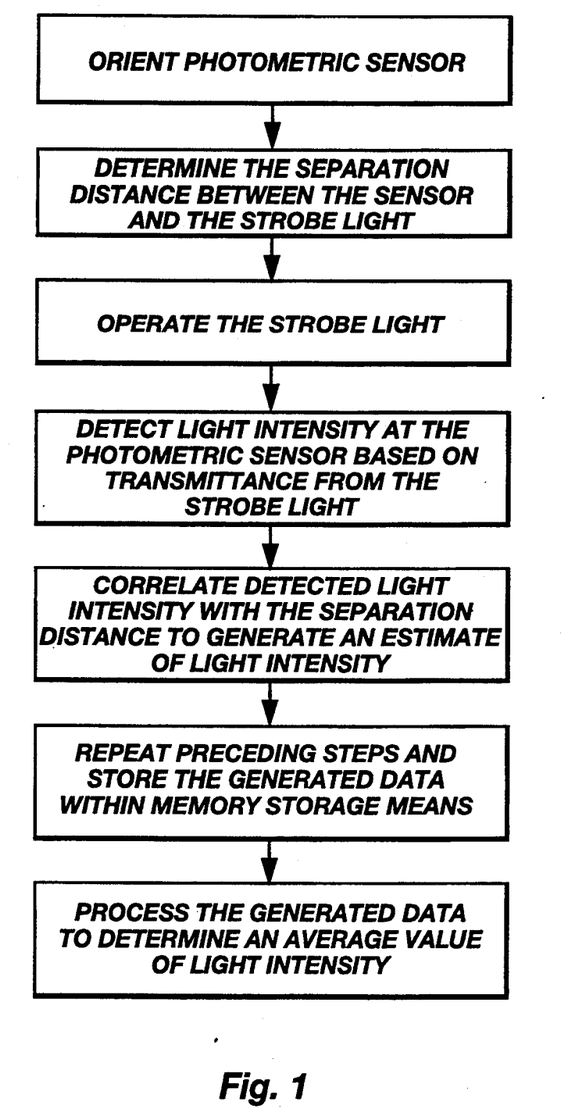
FIG. 1 shows a schematic representation of the steps of the present invention.
Figure 1A:
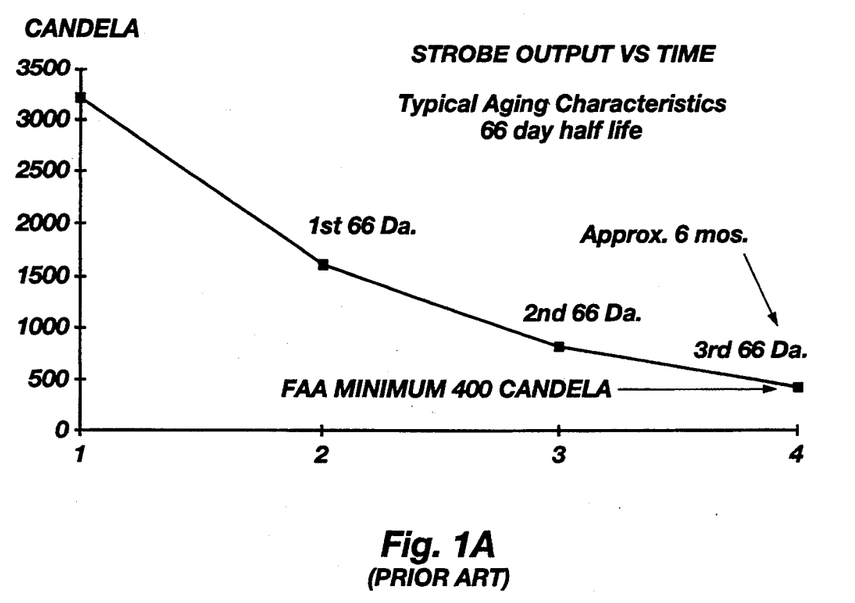
FIG. 1A shows a graphic representation of the loss of strobe light intensity with age as is known in the prior art.

Referring to FIG. 1, there is shown a schematic representation of the steps of the present invention. The devices used to implement each step will be explained in detail with respect to subsequent figures. The first two steps are to orient a photometric sensor toward the strobe light on the aircraft to be measured and to determine the distance between the strobe light and the sensor. As will be discussed in more detail below, this step will differ slightly depending on whether the reading is taken adjacent to the strobe light, or from a more distant location using a unit which aims the sensor at an aircraft positioned 60–750 feet way.

As will be appreciated by those familiar with aircraft, the different approaches have different advantages. Using a unit which takes readings from a distance allows the measuring of numerous planes from a single position as they wait for clearance to take-off or to pull up to their assigned ramp. In contrast, a unit performing close up measurements of lights on both sides of an aircraft can be applied within a relatively short time frame and gives a complete and more accurate status report on a given aircraft.

When the strobe light is operated, the photometric sensor detects light intensity based on transmittance from the strobe light. The detected light intensity is correlated with the distance between the sensor and the strobe light and adjusted for any filters which may be used with the sensor. The signal emitted by the sensor is then used to generate a data reading representing an estimate of light intensity emanating from the strobe light. Light intensity is a function of the amount of light generated at the strobe source, less the amount of loss from transmission through the surrounding plastic shield and dissipated into the atmosphere between the strobe light and the measuring device. The light intensity transmitted decreases with progressive build up of metal material being deposited on the interior of the flash tube, as well as because of wear on the exterior surface. Damage to the shield body, such as cracks in the lens, will also decrease transmission efficiency.

When time permits, the steps of orienting the photometric sensor toward the strobe light; determining the distance between the strobe light and the sensor; detecting light intensity; and correlating the detected light intensity with the distance to generate a data reading are repeated several times to obtain several readings representing estimates of light intensity for the same light. The data is then stored in a memory storage means, such as a computer, and subsequently processed to determine the average value of light intensity for the strobe light. Taking an averaging of the transmitted light is important because older strobe lights can vary by as much as fifty percent between any two individual flashes. Even newer lights can vary as much as twenty percent from flash to flash. Thus, the average value is more appropriate to determine the effective intensity, and thus the ability of the strobe light to warn other aircraft on the airplane's position.

Figure 2:
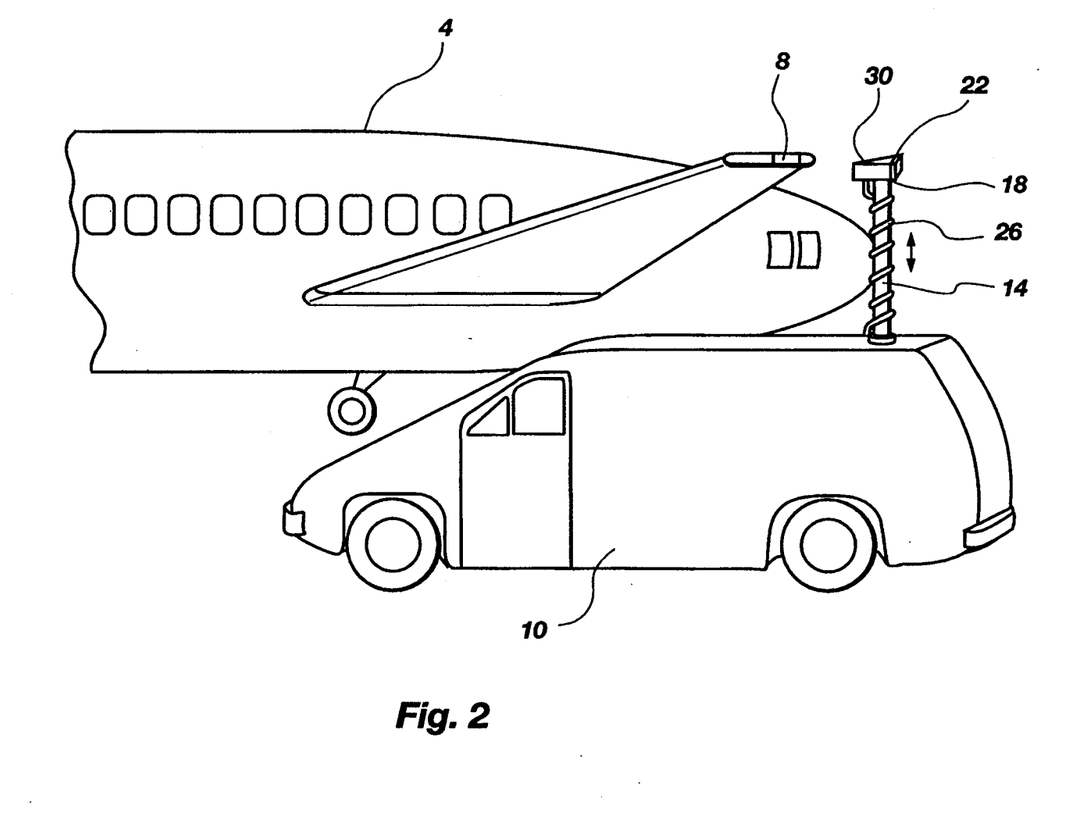
FIG. 2 shows a mobile system testing a strobe light on an airplane using a first embodiment of the present invention.

Referring to FIG. 2, there is shown an embodiment of the invention for close-up testing of the anticollision lights and a fragmented view of an airplane 4 with a strobe light 8 positioned along the end of the wing. A van 10, positioned next to the airplane 4, is provided with a telescoping arm 14 which can move up and down so that a top end 18 of the arm is at approximately the same height as the bottom of the strobe light 8. The telescoping arm 14 can be virtually any type which is commercially available, and can be designed to be controlled from within the van 10. Those skilled in the art will recognize that there are numerous telescoping arms available which can be readily modified in accordance with the aspects of the invention discussed below.

A carriage 22 is attached to the top of the telescoping arm 14 so that movement of the arm allows the carriage to be moved to a desired height. The telescoping aspect of the telescoping arm 14 allows one van 10 to service virtually all commercial airplanes.

The carriage 22 contains a photometric sensor (not shown) and other electronic equipment as will be explained in detail with regard to FIG. 3. A cord 26 extends from the carriage 22 to a control panel (not shown) in the van 10. Cables (not shown) within the cord 26 allow a user seated in the van 10 to control the electronics contained within the carriage 22.

It is anticipated that a front side 30 of the carriage 22 will be positioned approximately 3 feet from the strobe 8 during use. As, as will be apparent to those skilled in the art, this distance can be changed as long as a corresponding factor is used when processing the data. However, typically such measurements will be made within 10 meters of the plane. For each doubling of the distance between the strobe light and the sensor, the intensity will decrease by a factor of four. In other words, the decrease in light intensity is equal to 1 divided by the distance squared $(1/d^2)$.

Figure 3:
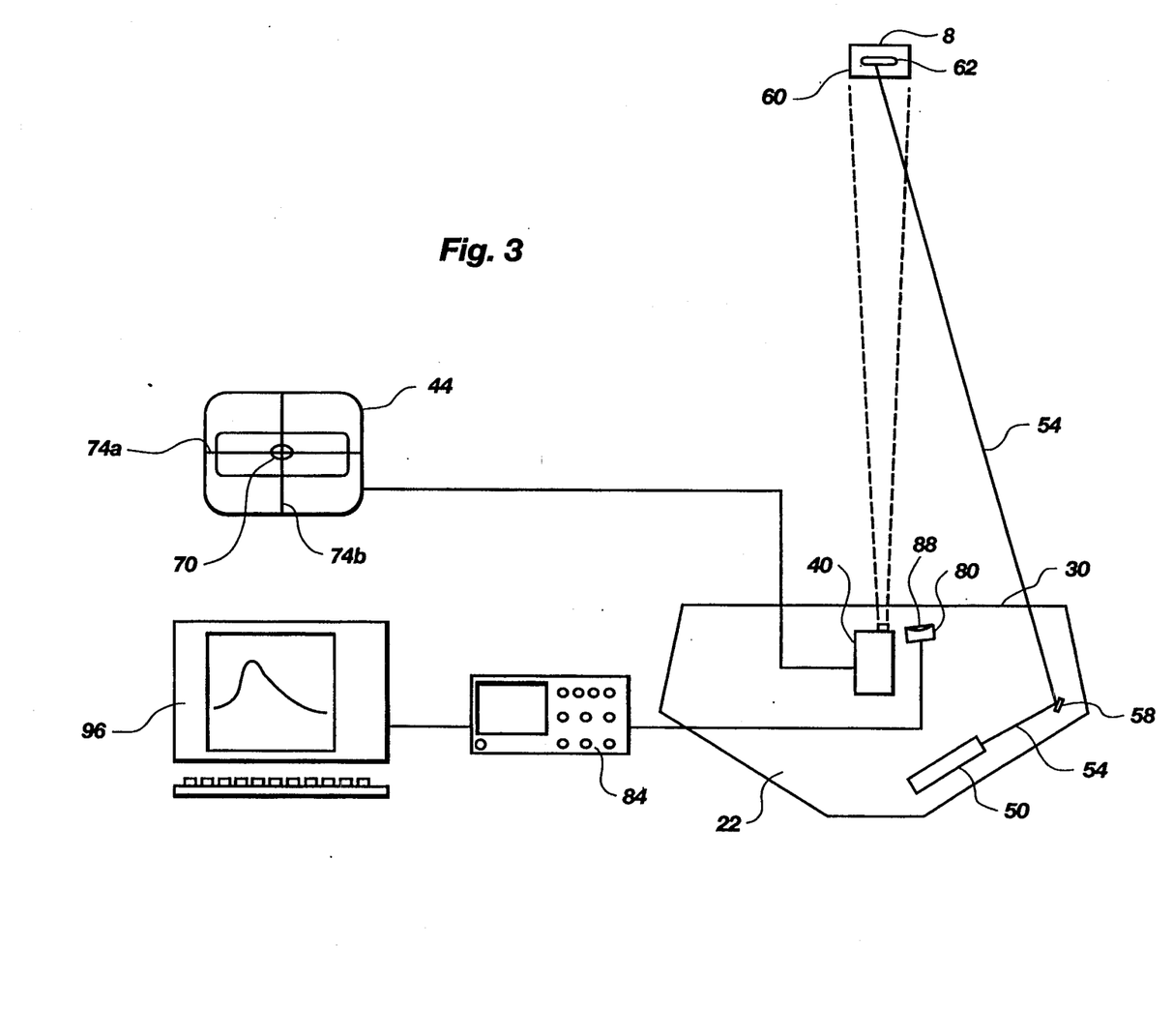
FIG. 3 shows a schematic representation of the workings of the first embodiment of the present invention.

Referring now to FIG. 3, there is shown a schematic representation of the structures used in the present embodiment of the invention. The carriage 22 includes a closed circuit television camera 40 which is in communication, via the cable, with a monitor 44 in the van (not shown). Both the television 40 and the monitor 44 can be virtually any type which is commercially available. However, for reasons which will be discussed below, it is best to have a camera 40 and monitor 44 which have a zoom feature as well as aperture adjustment and a color display.

The view angle 48 of the camera 40 is wide enough so that the user can see the entire strobe light 8. A representation of the strobe light 8 is shown on the monitor 44 in FIG. 3. Having a television camera 40 with a zoom lens, aperture control and color allows the user to perform a close-up inspection of the strobe light 8, including the lens 60 and the flash tube 62 to ensure that each is free of defects which might interfere with the proper functioning of the light. If the technician discovers material build-up, or any other problems such as cracks in the lens 60, he or she can recommend that the strobe light 8 be serviced. Thus, airline maintenance personnel need not routinely disassemble the strobe light 8 to ensure that it is in proper working order.

A laser generator 50 in the carriage 22 produces a laser beam 54 which is reflected off a mirror 58 toward the strobe light 8. The mirror 58 is angled so that the laser beam 54 crosses the center of the view angle 48 of the television camera 40 at a distance of three feet (or any other distance for which data is to be derived) from the front 30 of the carriage 22. (While the same function could be accomplished without the use of a mirror, a larger carriage would be needed to hold the laser generator 50 at an angle sufficient for close-up testing). When the laser beam 54 contacts the strobe light 8, a small dot 70 appears on the strobe light and is visible on the monitor 44. The dot 70 indicates to the user whether the carriage 22 is the proper distance from the strobe light 8, thus forming a laser/television ranging system. Crosshairs 74 on the monitor 44 allow the user to tell if the strobe light 8 is properly centered, both horizontally and vertically. The monitor 44 should be moved to within 10 degrees of the horizontal plane, and, as explained in the background section, the strobe light 8 should preferably be measured within ±5 degrees of the horizontal plane. If the dot 70 is not positioned so as to appear in the middle of the strobe light 8 (horizontally), the telescoping arm (not shown in FIG. 3) is adjusted until the height is proper. The horizontal positioning of the dot 70 and simple geometry informs the technician how far away the carriage 22 is from the strobe light 8.

With the positioning of the laser beam 54 shown in FIG. 3, a dot 70 positioned to the left of the vertical cross-hair 74b shows that the carriage 22 is too far away from the strobe light 8 and the van (not shown) must be moved toward the strobe light 8. If the dot 70 is to the right of the vertical cross-hair 74b, the carriage 22 is too close and must be moved away from the strobe light 8. (Obviously, if the laser beam 54 were reflected off a mirror 58 on the left side of the camera 40, the foregoing directions would be reversed.) Once the dot 70 is centered, the testing is begun. Those skilled in the art will be familiar with numerous other ways by which to assure that the carriage 22 is properly distanced from the strobe light 8.

Determining the distance between the carriage 22 and the strobe light 8 is important because light dissipates quickly. If the distance between the strobe light 8 and a sensor is not precise known, an inaccurate reading will be obtained. For example, if the carriage 22 is calibrated to take reading at three feet, but the test is conducted with the carriage being positioned six feet away from the strobe light 8, the resulting data would show an effective intensity of one-fourth that of the actual effective intensity. Thus, a factor accounting for the change in distance must be used in interpreting the data.

Figure 4:
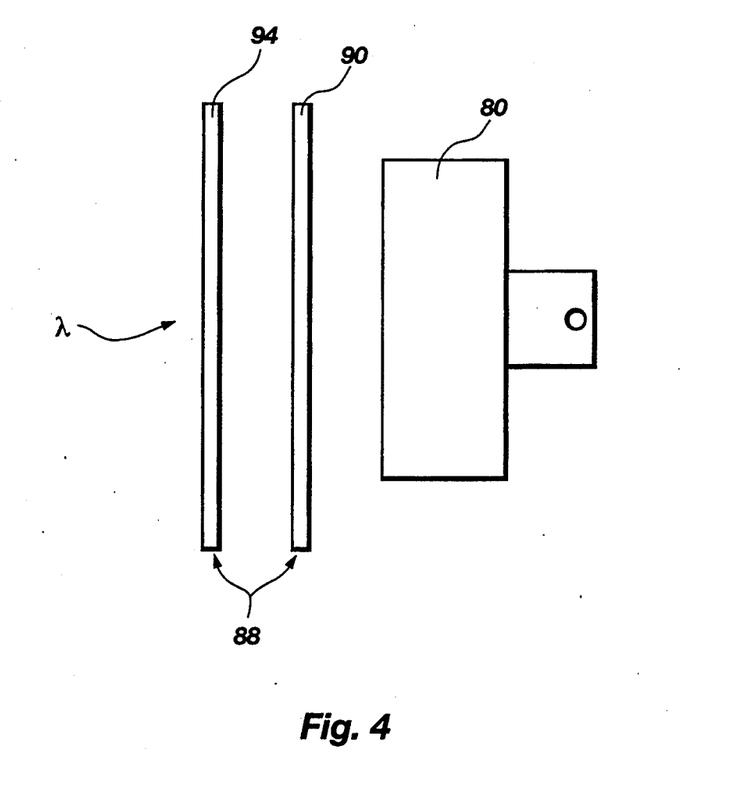
FIG. 4 shows an exploded, side cross-sectional view of a photometric sensor as used in the first embodiment of the present invention.
Figure 5:
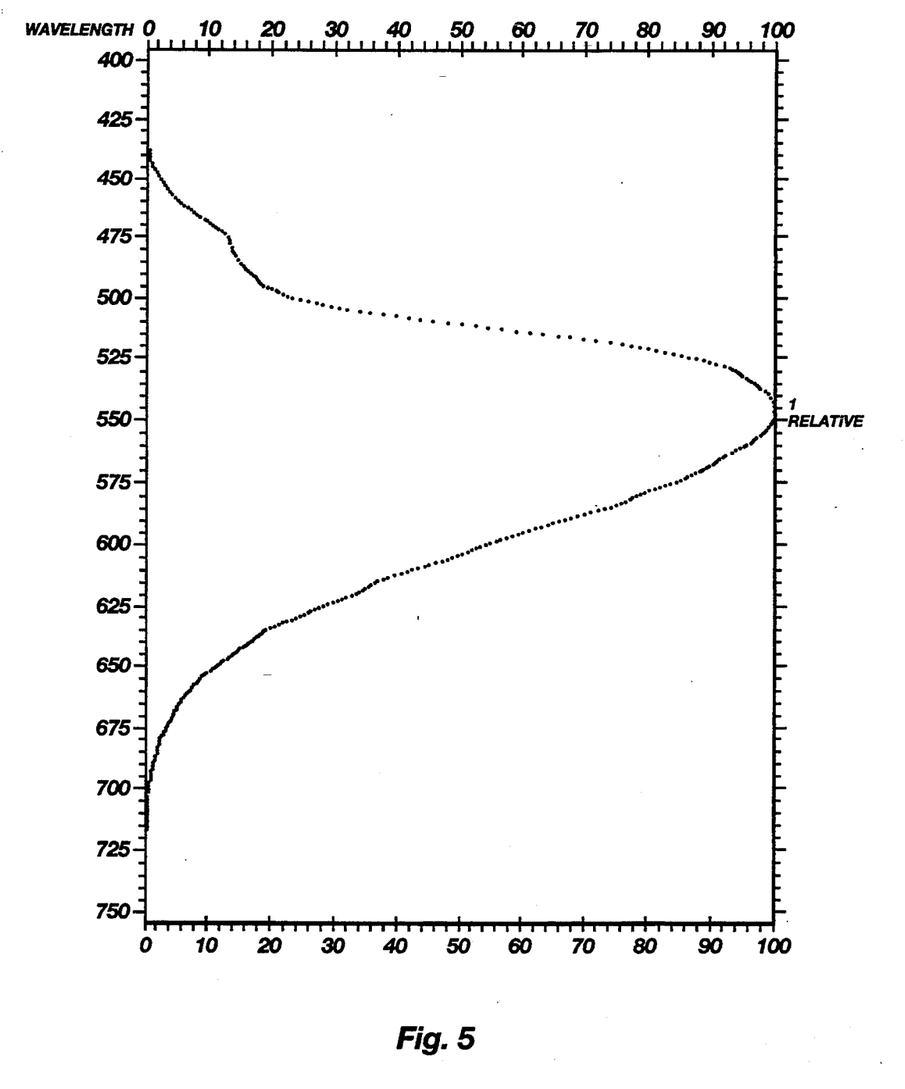
FIG. 5 shows a curve of the light frequencies measured by the photometric sensor used in the first embodiment of the present invention.

The effective intensity of the strobe light 8 is measured by a photometric or C.I.E. corrected sensor 80 which is positioned adjacent to the television camera 40. Referring to FIG. 4, there is shown an exploded, side cross-sectional view of a silicone sensor 80 used in the present embodiment of the invention and well know to those skilled in the art. The sensor 80 has two filters 88. One is a C.I.E. filter 90 which converts the sensor from radiometric measurements into a photometric sensor. In other words, the C.I.E. filter causes the sensor 80 to respond to the spectrum of light in the range normally seen by the human eye. As is shown in FIG. 5, this range is between about 400 nanometers and 700 nanometers, the peak being about 550 nanometers. Thus, the light can be quantified in candles, which is a photometric measurement. (This is important as the FAA regulations require that a strobe light have an effective intensity of 400 candles. Thus, a radiometric reading would not indicate whether the strobe light complied with FAA standards).

A neutral density filter 94 is also positioned in front of the sensor 80. Because the tests are not conducted in a light-tight room, the testing process must take into account any ambient light which the sensor 80 is likely to detect. Although the tests are usually conducted at night, most airports have large lighting systems which keep the docking areas well lit so that baggage crews, maintenance crews, and others can work about the aircraft. If not filtered, these lights would be received by the sensor and give a reading which is artificially high. This ambient light, therefore, could result in inadequate strobe lights being found acceptable. Thus, the ambient light must be eliminated or minimized as a factor.

In the present embodiment of the invention, most of the ambient light is filtered out by the use of a neutral density filter 94 having a filtering capacity of 10 to 1000X. In addition to filtering out ambient light, the neutral density filter 94 prevents the extremely bright light emitted from the strobe light 8 from saturating the photometric sensor 80. The filters 88 will attenuate the incoming light sufficiently that the sensor 80 will give off between 0 and 80 millivolts in response to the light received. Ideally, the output of the sensor 80 will be kept between 0 to 50 millivolts.

The photometric sensor 80 passes a signal to a digitizing oscilloscope or DSO 84 (FIG. 3) which digitizes the information and provides a means to observe a curve produced by the signal. The DSO 84 also enables the user to adjust the trigger level (or sensitivity), the amplitude, and the sweep time at which the incoming information is displayed. The adjustments are made to obtain the largest waveform possible without running the wave form off the screen. A good example of such a wave form is provided on the computer screen 96 in FIG. 3.

The technician operating the system will first adjust the DSO 84 so that the trigger level, amplitude and sweep time are proper. Those skilled in the use of oscilloscopes will readily understand which adjustments to make so that an acceptable curve is displayed. He or she will then take readings from 8 to 16 flashes of the strobe light 8 (FIGS. 2 and 3). An advantage of the DSO 84 is that it can process individual signals from the photometric sensor 80, or provide an average of a series of signals developed in response to a series of flashes. The digitized information is then passed to a computer 96 where the information is further processed to give average effective intensity reading for the measured light.

Figure 6A:
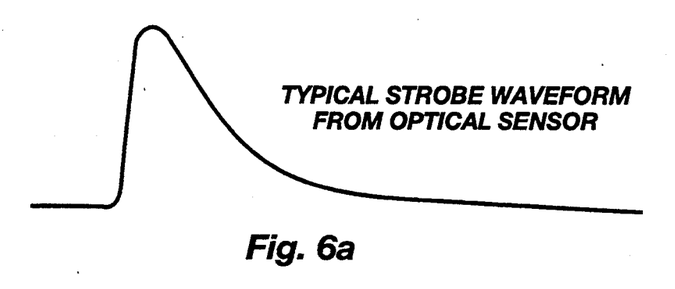
FIGS. 6a-e show curves representing the impulse seen on the digitizing oscilloscope.
Figure 6B:
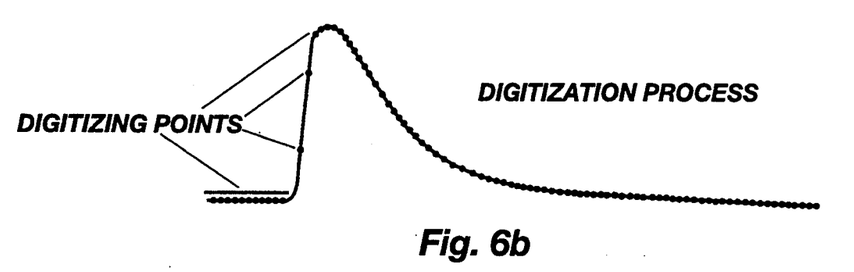
Figures 6C, 6D:
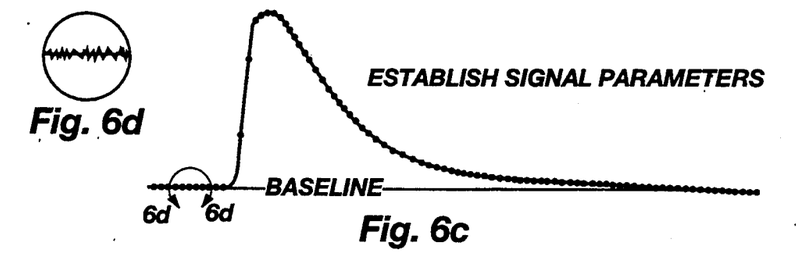

Referring to FIGS. 6a–e, there are shown a plurality of curves. FIG. 6a shows a typical strobe electrical signal similar to that which would be passed from the optical sensor to the DSO FIG. 3. FIG. 6b shows the waveform being digitized. However, the illustration shows only one fifth of the samples which are taken in reality. In other words, each point along the curve represents five individual digitized samples which is stored as a discreet unit and passed on to the computer 96 (FIG. 3). FIG. 6c and close-up 6d show the data as it is downloaded into the computer 96. The computer 96 scans the data for a number of key factors. First, looking at FIG. 6d, the samples shown are those taken prior to the flash from the strobe light. Typically, 25 samples are averaged in order to establish a level baseline for integration. This level is important as it will represent the ambient light level in the case of using sensor. (In the case of a long range detector, which will be discussed below, the baseline represents preamplifier DC drift). Very low frequency modulation may also be present which could produce an error in measurement. Thus, the "height" of the curve is measured from the baseline to the top of the curve. This reduces ambient light as a factor and focuses on the intensity of the strobe light being measured.

Other references points are also measured along the curve. These include pulse amplitude, and sample points at 10, 50 and 90 percent along the curve. The information gathered by these points allows the user to determine the "health" of the strobe (i.e. factors other than intensity) but not the intensity of the strobe light itself.

Figure 6E:
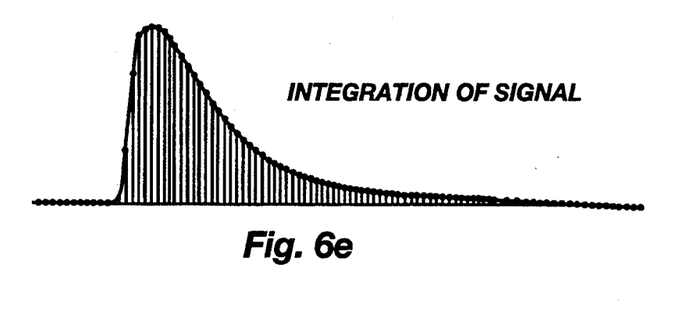

Referring now to FIG. 6e, there is shown the area of integration. The downloaded information contains the amplitude value and time value (calibrated) of each point. It is then a simple matter to integrate the area beneath the waveform in relation to the baseline. Using this information and accounting for the distance and a calibration factor for a given sensor, the flash intensity for the distance can readily be computed. Those familiar with computer programming and calculus will be readily able to design a computer program which can establish the baseline and use integration to establish the area between the top of the curve and the baseline.

Processing the data in this way allows the user to obtain an average of the light intensity emitted by the strobe. The average intensity is often more important than an individual intensity of a flash because the intensity of the light emitted from strobe lights can vary significantly between any two given flashes.

The DSO 84 digitized information could also be sent to the computer 96 and stored for later processing. Thus, the intensity levels for many planes could be taken and then processed at a later time. The computer would also allow mixing of data from different aircraft. For example, the FAA could perform spot inspections and determine the average effective intensity for all of the airplanes monitored, as well as for any individual plane. Those skilled in the art will recognize numerous other applications for the data digitized by the DSO 84.

To date, the principal DSO's which have been used with the present embodiment of the invention are Tektronix DSO models 221, 2432 and TDS320, manufactured by Tektronix, Inc. Beaverton, Oregon. However, it is anticipated that virtually any DSO could be used, with the quality of the information received being largely dependant on the quality of the DSO.

Once the data is processed, it can be graphically displayed, and/or down loaded to a memory storage devise, such as a computer disk, where the information can be subsequently used to determine whether the strobe lights 8 comply with the FAA standards. As will be appreciated by those skilled in the art, having the information stored in a computer allows a technician to look at the information and determine when the strobe light should be serviced or replaced. Additionally, the curves accompanying each strobe light could be analyzed for scientific purposes, such as creating more visible lights, or lights which consume less energy. Once in the computer, the data can easily be converted to a graphic display or some other sort of readable form whenever it is convenient.

The following table provides a sampling of data readings taken in the close-up mode of operation on actual aircraft.

| Aircraft number & type | Candela Output | Amplitude Variation, % | Timing Sec./Flash | Timing Variation, % | Comments | <100 Cd | <400 Cd |
|---|---|---|---|---|---|---|---|
| B-737-200 | | | | | | | |
| Port Wingtip | 1465 | +8.2/−7.9 | 2.008 | +1.5/−0.4 | Slow flash rate | 0 | 0 |
| Stbd. Wingtip | 837 | +9.8/−9.0 | 1.006 | +3.4/−0.6 | | 0 | 0 |
| Tail | 1589 | +5.5/−7.4 | 1.004 | +3.6/−0.4 | | 0 | 0 |
| Upper Flsg. | | | | | | | |
| Lower Flsg. | 123 | +7.5/−28 | 0.974 | +6.7/−92 | Timing var. due to noisy signal | | 1 |
| B-737-200 | | | | | | | |
| Port Wingtip | 1624 | +4.8/−4.1 | 1.021 | +29/−2.1 | Good! Recently replaced? | 0 | 0 |
| Stbd. Wingtip | 258 | +22/−16 | 1.004 | +3.6/−0.4 | Very weak for wing tip | 0 | 1 |
| Tail | 225 | +43/−35 | 1.006 | +3.3/−0.6 | Very weak for tail | 0 | 1 |
| Upper Flsg. | | | | | | | |
| Lower Flsg. | 58 | +8.3/−5.7 | .98 | +2.0/−2.0 | | 1 | 1 |
| B-737-300 | | | | | | | |
| Port Wingtip | 447 | +31/−19 | 1.004 | +3.6/−0.4 | Fairly large amplitude swing | 0 | 0 |
| Stbd. Wingtip | 508 | +87/−41 | 0.956 | +8.8/−96 | Very erratic! see WF! | 0 | 0 |
| Tail | 335 | +303/−36 | 1.115 | problem? | Occasional very large flash | 0 | 1 |
| Upper Flsg. | | | | | | | |
| Lower Flsg. | 113 | +7.4/−55 | 0.904 | +6.2/−82 | Var. = occasional weak double | 0 | 1 |
| B-737-200 | | | | | | | |
| Port Wingtip | 172 | +338/−32 | 1.062 | +92/−5.8 | Missing flshs; excess ampl. var | | 1 |

-continued

| Aircraft number & type | Candela Output | Amplitude Variation, % | Timing Sec./Flash | Timing Variation, % | Comments | <100 Cd | <400 Cd |
|---|---|---|---|---|---|---|---|
| Stbd. Wingtip | 1989 | +11/−12 | 1.006 | +3.4/−0.6 | Very good! Recently replaced? | 0 | 0 |
| Tail | 740 | +13/−11 | 1.004 | +3.6/−0.4 | — | 0 | 0 |
| Upper Flsg. | | | | | | | |
| Lower Flsg. | 118 | +6.1/−7.4 | 1.108 | +1.0/−2.6 | | | 0 | 1 |
| B-737-200 | | | | | | | |
| Port Wingtip | 103 | +11/−19 | 1.004 | +3.6/−0.4 | Very weak for wing tip | 0 | 1 |
| Stbd. Wingtip | 537 | +13/−10 | 1.004 | +3.6/−0.4 | | 0 | 0 |
| Tail | 267 | +78/−27 | 1.115 | +79/−10 | | 0 | 1 |
| Upper Flsg. | | | | | | | |
| Lower Flsg. | 13 | — | — | — | Too weak to get train data | 1 | 1 |

Figure 7:
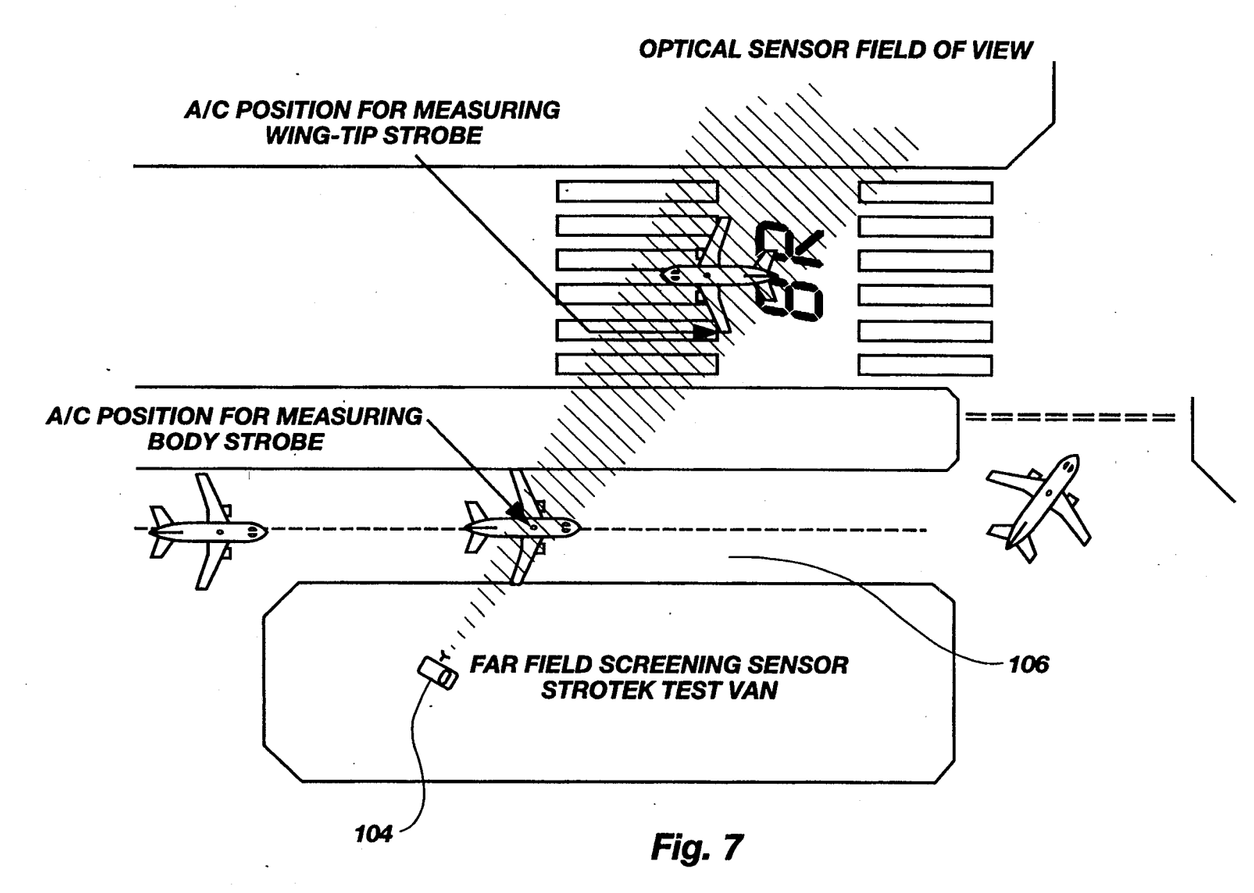
FIG. 7 shows a second embodiment of the present invention used to take readings at a distance from the aircraft.
Figure 8:
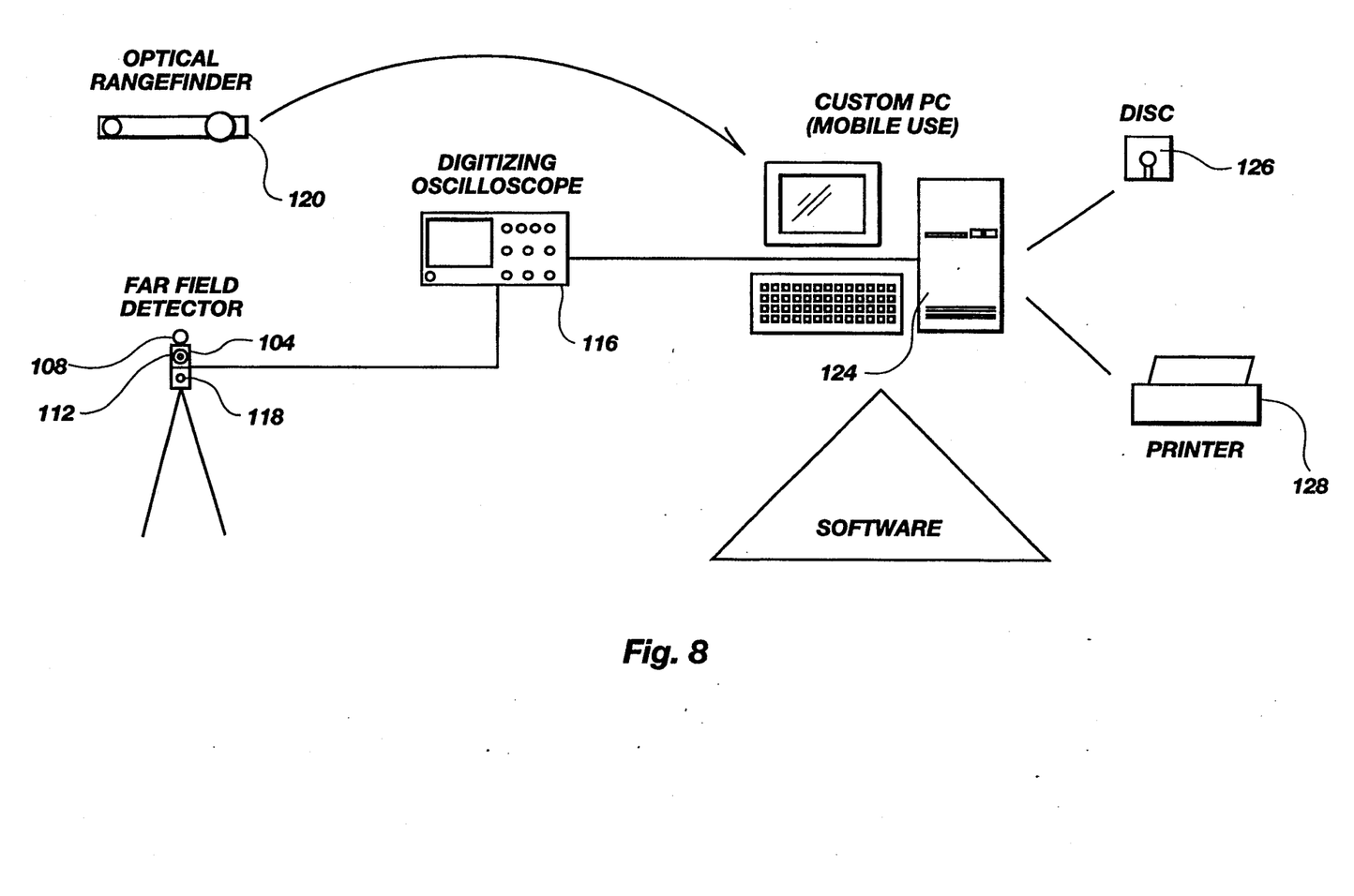
FIG. 8 is a schematic representation of the second embodiment of the invention as shown in FIG. 7.

Referring now to FIGS. 7 and 8, there is shown a second manner of practicing the present invention. Often, it is impractical to drive a van up to every aircraft which needs to be monitored. This is especially true at a very busy airport where the vans may interfere with airplane movement and other ground traffic. Additionally, an airline or the FAA may wish to do random spot checks at a given airport to ensure that the regulations are being complied with. Thus, an embodiment of the invention which allows the varying aspects of the invention to be practiced from a distance is desirable.

An additional advantage of a distantly operated system is that some strobe lights are located in positions which make them difficult to reach with the van. In particular, it would be very cumbersome to use the van to check the strobes on the top and bottom of the fuselage of most airplanes. Thus, it is advantageous to have a testing system which allows aircraft to be tested from afar.

Referring specifically to FIG. 7, a "far field" or long range detector 104 is positioned within about 100 feet of the "run-up" area 106 on the active runway of the airport. While the detector 104 is mobile, it is usually kept in one spot so that it can test numerous planes. As is shown by the shaded area of FIG. 6, the detector 104 measures the effective intensity of strobe lights within a relatively narrow band. In actual use, the detector 104 is narrow enough that it may be directed toward a single strobe light on a distant plane.

Referring specifically to FIG. 8, the detector 104 has a siting scope 108, such as a commercially available pistol or rifle scope, to enable to user to target which strobe light is to be measured. The detector 104 also includes a long range sensor 112 which has a field of view of between 8 and 14 degrees so that the detector can focus on a single strobe light at a time.

The long range sensor 112 has a C.I.E. filter (not shown) to enable the sensor to respond photometrically. Thus, the long range sensor 112 can take readings from afar which correspond the effective intensity of the strobe light for a human eye. Unlike the first embodiment, the long range sensor 112 is not covered with a neutral density filter. Such a filter is not necessary as the long range sensor 112 is far enough away from the strobe light that the flash will not saturate the sensor. However, because the neutral density filter is not present, other precautions must be taken to eliminate, or at least minimize, ambient light so that the ambient light does not skew the readings.

Figure 9:
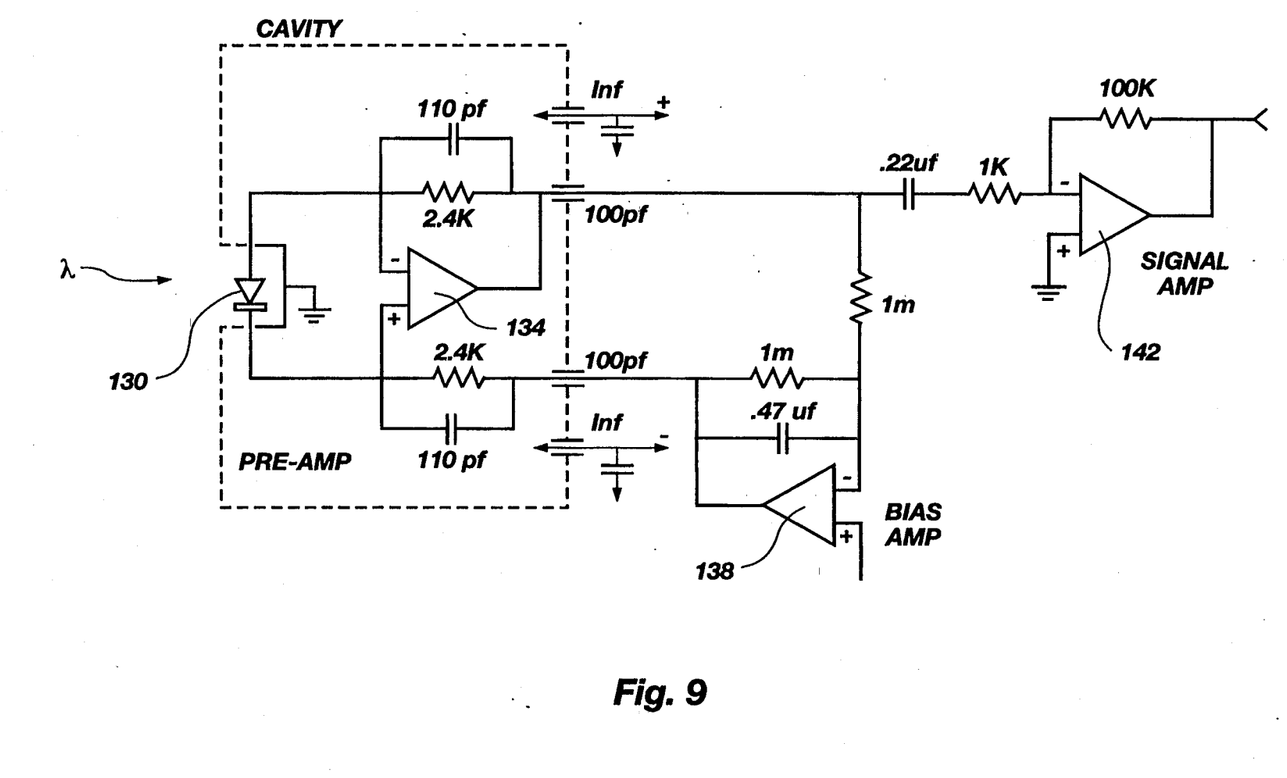
FIG. 9 is a schematic representation of the circuitry used to filter out ambient light in the second embodiment of the invention.
Figure 10:
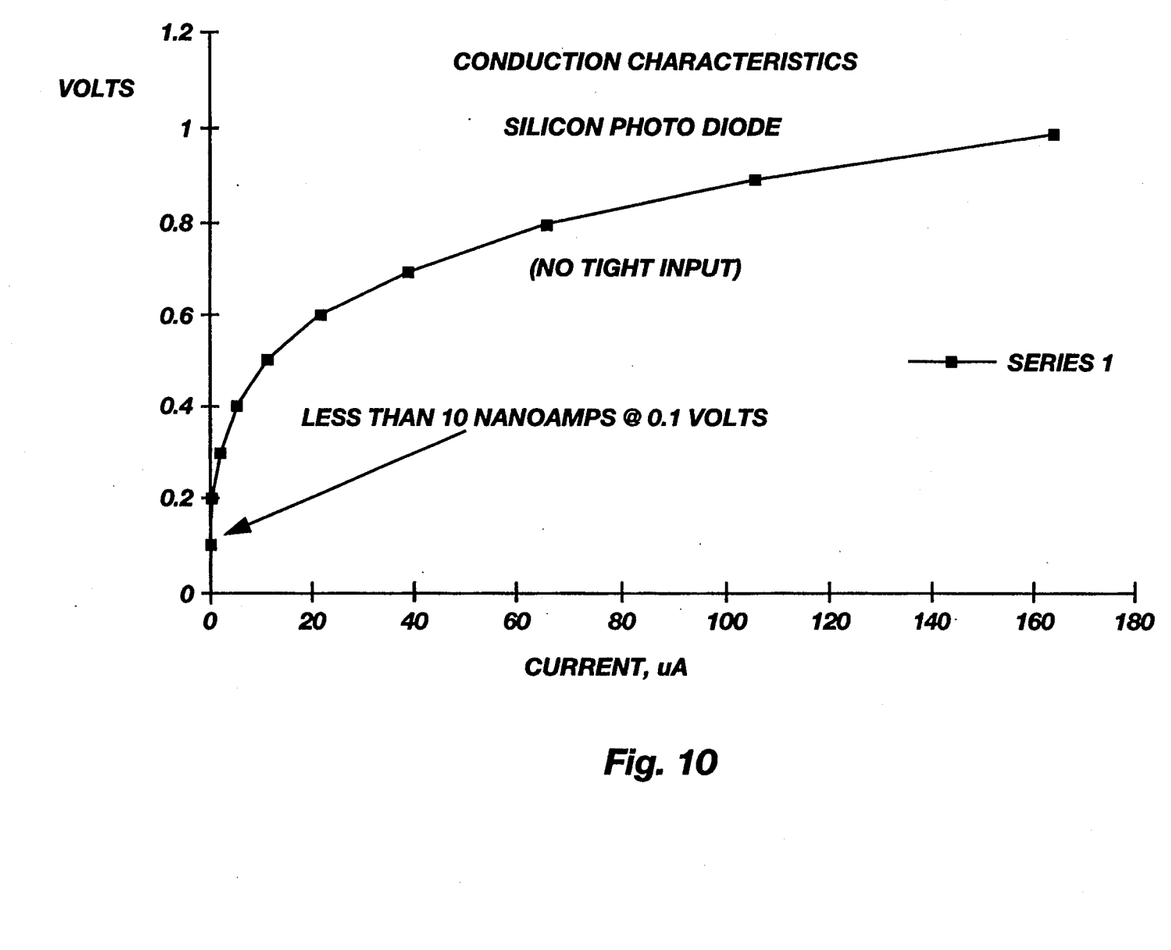
FIG. 10 is a graph of the current/voltage output of the diode used in the second embodiment of the present invention.

The circuitry within the detector is designed to "null out" ambient light without filters. Referring to FIG. 9, this is accomplished by providing a silicone photo diode or sensor 130 which produces a voltage and/or current in response to light. A first amplifier 134 attempts to maintain the sensor 130 at 0 volts. (As is shown in FIG. 10, the diode 130 produces virtually no current until the voltage passes two-tenths of a volt). However, when light strikes the sensor 130, the sensor develops a small current. The first amplifier 134, which converts current to voltage) produces a counter-current which it send to the opposite end of the sensor 130 to keep the sensor at 0 volts. However, even ambient light is sufficient to allow some current to pass through the circuit to a biasing amplifier 138.

When the light impulses are small and steady tie due to ambient light) the biasing amplifier 138 counters the current so that the effective voltage in the circuitry is zero. In other words, the biasing amplifier 138 nulls out the current due to ambient light by performing the function of integration. When a sudden increase in the current (and thus voltage) occurs due to the flash of a strobe light, the biasing amplifier cannot respond quickly enough, thus allowing voltage to pass to a third, signal amplifier 142. This amplifier increases the gain by about 100 times. Characteristically, the bandwidths being amplified through the signal amplifier 142 are between about 33 Hz and 106 KHz.

Referring again to FIG. 8, the amplified signals are then passed to the digitizing oscilloscope DSO 116 where the signals are further processed to account for ambient light. When used in the second embodiment of the invention, the DSO 116 is adjusted for trigger level, amplitude and time interval in the same manner as the DSO of the first embodiment, and the DSO digitizes the information in the same manner described above. By using the biasing amplifier 134 (FIG. 9) and the baseline adjustments described above, ambient light is minimized as a factor in the effective intensity calculation. While many different DSO's could be used with the present invention, the inventor has found that Tektronix models 2221 and 2432, both available from Tektronix, Inc. have worked well.

An optical range finder 120 is also used with the long range detector 104. The range finder 120 can be any commercially available optical range finder, such as those commonly used in hunting. Ideally the range finder 120 will be interfaced with the computer 124. However, the it is anticipated that for the near future the distance reading will be entered manually by the technician into the computer 124. Because the long range detector 104 takes its readings from varying distances, it is crucial to factor in the distance between the detector and the strobe light which is being tested. As was implied in the discussion of light dissipation above, without knowing the distance between the strobe light and the sensor, it is virtually impossible to determine the effective intensity of the strobe light. Thus, the information from the optical range finder 120 is entered into the computer 124 to let the computer know the distance between the long rang detector 104 and the aircraft. When the computer 124 downloads the information from the DSO, the computer processes the data and factors in the distance at which the reading was taken. The processed data can then be downloaded to a disk 126, or sent to a printer 128.

As with the first embodiment, the user will typically take sample from between 8 and 16 strobe light flashes. Because the aircraft is typically about to take off as the information is being gathered, the user also records other information such as hull number, type of aircraft, and the owner, if known. This could be accomplished by a television camera 118 formed integrally with the long range detector 104. Due to the busy nature of most airports, the data is often downloaded in a preliminary form and the processing done at a later time.

One disadvantage of the long range detector 104 is that there is often only time to run tests on one strobe light prior to the aircraft being cleared for take off. Thus, while it is good for performing spot checks on a number of aircraft, it is important to be able to use the close-up detector of the first embodiment for thorough checks. The long range detector 104 will not find cracks and material build up on the strobe light. Rather, it will simply inform the user of the effective intensity of the strobe light measured. Cracks and material build up will not be discovered until effective intensity declines.

In the manner described above, there is disclosed a new method for site measurement of strobe light intensity on aircraft. It will be understood that other variations and modifications of the method will be apparent to those skilled in the art without departing from the scope of the invention. The described method is not meant to be a delineation of the scope of the invention, but merely examples of two presently preferred embodiments.

Additionally, while the above discussion has focused on the testing of airplane anticollision lights, the present invention is equally applicable to anticollision strobe lights on boats, bridges and other structures. The exact location of the strobe light on the boat, bridge, etc., will determine whether the close-up method or the far field method is used.

I claim:

1. A method for on-site measurement of light intensity of strobe lights on an aircraft, said method comprising the steps of:
    a) orienting a photometric sensor toward the strobe light on the aircraft to be measured;
    b) determining distance between the sensor and the strobe light;
    c) operating the strobe light;
    d) detecting light intensity at the photometric sensor based on transmittance from the strobe light;
    e) correlating detected light intensity with the distance between the sensor and the strobe light to generate a data reading representing an estimate of light intensity emanating from the strobe light;
    f) immediately repeating the preceding steps to determine additional data readings representing estimates of light intensity for the same strobe light;
    g) storing the generated data within memory storage means; and
    h) processing the generated data to determine an average value of light intensity at the strobe light of the aircraft.

2. A method as defined in claim 1, wherein the method for measurement is accomplished in close proximity to the aircraft, said method comprising the more specific steps of:
    a) positioning the photometric sensor on extendable elevation means associated with a movable vehicle;
    b) moving the vehicle to the proximity of the aircraft;
    c) elevating the photometric sensor to a measurement position oriented within a ten degree elevation of a horizontal plane corresponding to an elevation of the strobe light to be measured and within a distance of less than approximately 10 meters;
    d) orienting the photometric sensor toward the strobe light on the aircraft to be measured;
    b) determining the distance between the sensor and the strobe light;
    c) operating the strobe light;
    d) detecting the light intensity at the photometric sensor based on transmittance from the strobe light;
    e) correlating the detected light intensity with the distance between the sensor and the strobe light to generate the data reading representing the estimate of light intensity emanating from the strobe light;
    f) immediately repeating the preceding steps to determine the additional data readings representing estimates of light intensity for the same strobe light;
    g) storing the generated data within memory storage means; and
    h) processing the generated data to determine an average value of light intensity at the strobe light of the aircraft.

3. A method as defined in claim 2, wherein step c) comprises the more specific step of telescopically extending the elevation means with the attached sensor to the measurement position.

4. A method as defined in claim 2, further comprising the steps of a) generating identification data for a specific aircraft and associated strobe light being measured, and b) saving the identification data of the specific aircraft and strobe light within the memory storage means, associated with the generated data relating to light intensity.

5. A method as defined in claim 2, further comprising the steps of
    a) orienting a television camera in conjunction with the photometric sensor toward the strobe light to be measured;
    b) providing a viewing screen for a remote observer who operates the moving vehicle;
    c) transmitting input from the television camera to the viewing screen to enable the observer to guide the sensor into proper alignment with the strobe light to be measured.

6. A method as defined in claim 5, wherein the camera has a zoom feature, the method further comprising the step of using the zoom feature of the camera to enable the observer to conduct a close-up visual inspection of the strobe light.

7. A method as defined in claim 5, comprising the further steps of applying the television camera as part of a laser/television ranging system for enabling the observer to guide the sensor into proper alignment as well as provide accurate measurement of distance between the sensor and the strobe light.

8. A method as defined in claim 7, comprising the additional step of enabling remote control of the laser/television ranging system by an operator of the movable vehicle.

9. A method as defined in claim 2, comprising the additional step of enabling remote control of elevating the photometric sensor to the measurement position by an operator of the movable vehicle.

10. A method as defined in claim 2, wherein step d) comprises the more specific step of placing a neutral density filter between the sensor and the strobe light so as to minimize detection of ambient light.

11. A method as defined in claim 2, wherein step c) comprises the more specific step of elevating the photometric sensor to a measurement position oriented within a five degree elevation of a horizontal plane corresponding to an elevation of the strobe light to be measured and within a distance of less than approximately 2 meters.

12. A method as defined in claim 1, comprising the more specific steps of:
   a) positioning the sensor adjacent to a runway approach for aircraft;
   b) aligning the sensor with respect to an aircraft during taxi for take off as it approaches the runway;
   c) orienting the sensor toward an operating strobe light on the aircraft to be measured;
   d) determining distance between the sensor and the strobe light;
   e) detecting light intensity at the photometric sensor based on transmittance from the strobe light;
   f) correlating detected light intensity with the distance between the sensor and the strobe light to generate a data reading representing an estimate of light intensity emanating from the strobe light;
   g) immediately repeating the preceding steps to determine additional data readings representing estimates of light intensity for the same strobe light;
   h) storing the generated data within memory storage means; and
   i) processing the generated data to determine an average value of light intensity at the strobe light of the aircraft.

13. A method as defined in claim 12, wherein step c) comprises the more specific step of using a siting scope to direct the photometric sensor at a given strobe light.

14. A method as defined in claim 12, wherein step d) comprises the more specific step of using an optical range finder to determine the distance between the sensor and the strobe light to be measured.

15. A method as defined in claim 14, wherein the step f) comprises the more specific step of correlating detected light intensity with the distance reading provided by the optical range finder to generate a data reading representing an estimate of light intensity emanating from the strobe light.

16. A method as defined in claim 12, wherein the step f) comprises the further step of using a biased sensor so as to minimize processing of signals due to detection of ambient light.

17. A method as defined in claim 12, wherein the step f) comprises the further step of selectively amplifying frequencies emitted by a strobe light to minimize processing of signals due to detection of ambient light.

18. A method as defined in claim 12, wherein the step f) further comprises using a digitizing oscilloscope to process a plurality of signals between each emission from the strobe light and averaging the readings to thereby obtain an average intensity level of ambient light.

19. A method as defined in claim 18, wherein step f) further comprises correlating detected ambient light intensity with the light intensity during emission of light from the strobe light to generate a data reading representing an estimate of light intensity emanating from the strobe light.

20. A method as defined in claim 12, further comprising the steps of a) generating identification data for a specific aircraft and associated strobe light being measured, and b) saving the identification data of the specific aircraft and strobe light within the memory storage means, associated with the generated data relating to light intensity.

21. A method as defined in claim 12, wherein step a) comprises the more specific steps of
   a) orienting a television camera toward an aircraft being tested such that identification markings on said aircraft are visible;
   b) recording the information; and
   c) correlating the light intensity data with the markings on said aircraft and producing a report.

* * * * *